US006007223A

United States Patent [19]

Futami

[11] Patent Number: 6,007,223

[45] Date of Patent: Dec. 28, 1999

[54] PROJECTOR TYPE LAMP

[75] Inventor: Takashi Futami, Tokyo, Japan

[73] Assignee: Stanley Electric Co., Ltd., Tokyo, Japan

[21] Appl. No.: 09/008,385

[22] Filed: Jan. 16, 1998

[30] Foreign Application Priority Data

Jan. 17, 1997 [JP] Japan .................................... 9-006403
Jan. 17, 1997 [JP] Japan .................................... 9-006405
Nov. 12, 1997 [JP] Japan .................................... 9-310927

[51] Int. Cl.[6] ........................................ B60Q 1/02

[52] U.S. Cl. ........................ 362/517; 362/539; 362/520; 362/538; 362/518

[58] Field of Search .................................. 362/518, 506, 362/507, 509, 538, 539, 522, 307–309, 296–299, 300–303, 222, 224, 268, 517, 520

[56] References Cited

U.S. PATENT DOCUMENTS 4,456,948 6/1984 Brun ........................................ 362/268
4,914,747 4/1990 Nino ........................................ 362/517
4,953,063 8/1990 Nino ........................................ 362/517
5,285,358 2/1994 Watanabe et al. ...................... 362/539
5,303,126 4/1994 Taniuchi .................................. 362/517

*Primary Examiner*—Thomas M. Sember
*Assistant Examiner*—Ismael Negron
*Attorney, Agent, or Firm*—Ostrolenk, Faber, Gerb & Soffen, LLP

[57] ABSTRACT

A projector type lamp of the present invention has a projection lens and a reflector, wherein the projection lens comprises a cylindrical lens portion which forms a center portion of the projection lens and whose vertical cross section has a curve when the projector type lamp is installed and aspherical lens portions which are halves of an aspherical lens and formed continuous to the respective right and left end portions of the cylindrical lens portion. The reflector is divided into four parts located in upper and lower sides and right and left sides thereof; an upper reflection surface, a lower reflection surface, a right reflection surface, and a left reflection surface, the four reflection surfaces being formed as curved surfaces on the basis of oval surfaces and combined together. Therefore, the shape and area of the projection lens can be changed without losing the characteristics of the projector type lamp, while there are problems for the prior projector type lamp of lacking visibility of the projector type lamp from a vehicle running in an opposite direction and a passenger and design freedom, the front shape of the projection lens to be selected being only relatively small circles.

17 Claims, 6 Drawing Sheets

PROJECTOR TYPE LAMP

BACKGROUND OF THE INVENTION

1. Field of the Invention

This invention relates to an illumination lamp such as a head lamp, a fog lamp or the like and, more specifically, to a lamp called "projector type lamp" which mainly comprises a reflector having two focal points, such as a rotary ellipsoid or a composite ellipsoid, a projection lens for projecting an image of a light source, which is positioned at a first focal point of the reflector, at a second focal point of the reflector, and a shade for controlling light distribution characteristics.

2. Background Art

FIG. 11 shows the configuration of a head lamp as an example of a projector type lamp 90 of the prior art. This projector type lamp 90 comprises a reflector 91 which is formed, for example, as a composite ellipsoid having first and second focal points, a light source 92 positioned at the first focal point, a shade 93 arranged in the vicinity of the second focal point, a projection lens 94 which is an aspherical convex lens having a focal point in the vicinity of the shade 93, and a housing, not shown, for holding these elements at predetermined locations.

Since the head lamp is configured as described above, rays of light from the light source 92 reflected by the reflector 91 are all converged into a light flux at the second focal point. At this point, since the shade 93 is arranged in the vicinity of the second focal point, substantially a lower half portion of the light flux is shaded and an upper half portion is inverted by the projection lens 94, enlarged and projected in an illumination direction to obtain light distribution characteristics for low beams which do not include upward rays.

However, in the above projector type lamp 90 of the prior art, since the projection lens 94 serves as a light emission surface at the time of lighting, the light emission area is smaller than those of lamps of other types which use a parabolic reflector and a cut lens, thereby deteriorating the visibility of the projector type lamp from a car running in an opposite direction or a passenger.

The projection lens 94 appears circular when seen from the front and only the projection lens 94 can be seen when it is installed on a vehicle. Therefore, any lamp provides the same impression. It is substantially impossible to produce a design difference according to the type of a vehicle, even if it is desired. Thus, the projector type lamp of the prior art has such a defect as lack of design freedom.

Further, since the projection lens 94 is smaller than those of the lamps of other types as described above, the heat of the light source 92 is concentrated on the projection lens 94, whereby the temperature of the projection lens 94 rises sharply. Therefore, a glass member must be used to provide heat resistance to the projection lens 94, thereby boosting costs and making it difficult to reduce the weight of the lamp. Solutions to these problems have been awaited.

As for design freedom described above, there has been proposed a method for forming a substantially oval projection lens by cutting end portions in a vertical direction of the projection lens 94 as shown in FIG. 12. In this case, the light emission area becomes much smaller at the time of lighting with the result of deteriorated visibility, a loss in the amount of light and the difficulty of arranging the shade 93. Thus, the formation of light distribution characteristics is restricted and the problems of the prior art cannot be solved.

SUMMARY OF THE INVENTION

As means for solving the above problems of the prior art, a first aspect of the present invention is to provides a projector type lamp comprising a light source, a projection lens, a reflector, a shade which is provided as required, and a housing for supporting these elements, wherein the projection lens comprises a cylindrical lens portion which forms a center portion of the projection lens and whose vertical cross section has a curve when the projector type lamp is installed and aspherical lens portions which are halves of an aspherical lens and formed continuous to the respective right and left end portions of the cylindrical lens portion, and the reflector is divided into four parts located in upper and lower sides and right and left sides thereof when the projector type lamp is installed; an upper reflection surface, a lower reflection surface, a right reflection surface, and a left reflection surface, the four reflection surfaces being formed as curved surfaces on the basis of oval surfaces and combined together.

A second aspect of the present invention is to provide the projector type lamp as above, wherein the division of the reflector is carried out along radially extending lines passing through the center of the reflector and in an angular range of 10 to 45 degrees in upper and lower directions from a horizontal line when the projector type lamp is installed.

A third aspect of the present invention is to provide the projector type lamp of the above, wherein the projector type lamp is constructed such that the upper and lower reflection surfaces of the reflector generate rays of light which are made incident upon the cylindrical lens portion of the projection lens and the right and left reflection surfaces generate rays of light which are made incident upon the aspherical lens portions.

A fourth aspect of the present invention is to provide the projector type lamp of the above, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces, the right and left reflection surfaces generate rays of light which are made incident upon the aspherical lens portions, and the auxiliary reflection surfaces generate rays of light which are made incident upon the cylindrical lens portion.

A fifth aspect of the present invention is to provide the projector type lamp of the above, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces with interfaces at positions substantially corresponding to interfaces between the cylindrical lens portion and the aspherical lens portions, each of the right and left reflection surfaces has a second focal point in the vicinity of the focal point of the aspherical lens portion, and each of the auxiliary reflection surfaces has a second focal point in the vicinity of the peak of the aspherical lens portion.

A sixth aspect of the present invention is to provide the projector type lamp of the above, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces with interfaces at positions substantially corresponding to interfaces between the cylindrical lens portion and the aspherical lens portions, each of the auxiliary reflection surfaces being divided at a horizontal line passing through the center of the reflector when the projector type lamp is installed into a upper auxiliary reflection surface and a lower auxiliary reflection surface, each of the right and left reflection surfaces has a second focal point in the vicinity of the focal point of the aspherical lens portion, each of the upper auxiliary reflection surfaces has a second focal point in the vicinity of the peak of the aspherical lens portion, and each of the lower auxiliary reflection surfaces has a second focal point on the extended line which is formed by outwardly extending the focal point of the projection lens so as to obtain reflected light caused to converge in the vertical direction and caused to be parallel to the optical axis in the horizontal direction.

A seventh aspect of the present invention is to provide the projector type lamp of the above further comprising a shade, wherein a cutaway portion in the shade for forming an asymmetrical pattern in light distribution characteristics is provided at two positions substantially corresponding to the interfaces between the cylindrical lens portion and the aspherical lens portions of the projection lens.

An eighth aspect of the present invention is to provide a projector type lamp comprising a light source, a projection lens, a reflector, a shade which is provided as required, and a housing for supporting these elements, wherein the projection lens comprises a cylindrical lens portion which forms a center portion of the projection lens and whose vertical cross section has a curve when the projector type lamp is installed and aspherical lens portions which are halves of an aspherical lens and formed continuous to the respective right and left end portions of the cylindrical lens portion.

A ninth aspect of the present invention is to provide the projector type lamp of the above, wherein the projection lens has an aspect ratio of 1:1.2 to 1:5.

A tenth aspect of the present invention is to provide the projector type lamp of the above, wherein at least the interior surface on the projection lens side of the shade of the projector type lamp is subjected to a reflection treatment or a coloring treatment.

An eleventh aspect of the present invention is to provide the projector type lamp of the above, wherein a hood whose interior surface is subjected to a reflection treatment is provided in front of the projection lens in an illumination direction in such a manner that it surrounds the projection lens.

BRIEF DESCRIPTION OF THE DRAWINGS

These objects and advantages of the present invention will become clear from the following description with reference to the accompanying drawings, wherein.

DETAILED DESCRIPTION OF THE PREFERRED EMBODIMENTS

Figure 1:
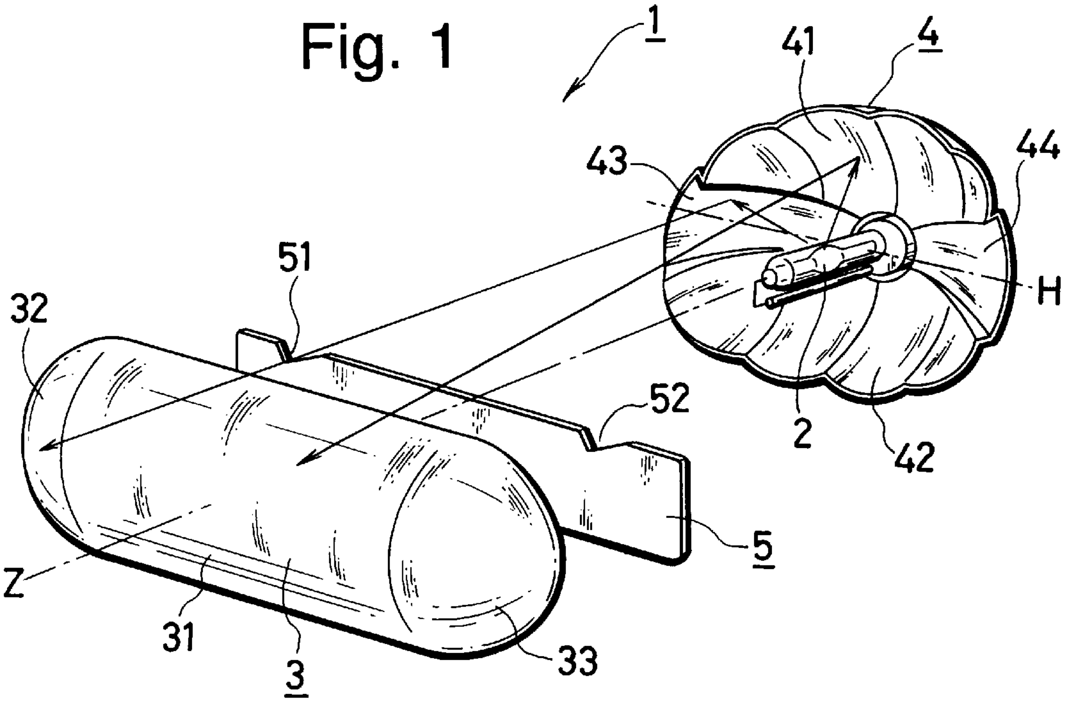
FIG. 1 is a schematic view of a projector type lamp according to a first embodiment of the present invention.

The present invention is described in detail hereinafter with reference to preferred embodiments shown in the accompanying drawings. In FIG. 1, reference numeral 1 denotes a projector type lamp according to a first embodiment of the present invention. The projector type lamp 1 of the first embodiment comprises a light source 2 such as a tungsten halogen lamp or metal halide electric discharge lamp, a projection lens 3, a reflector 4, a shade 5 which is provided as required to form, for example, light distribution characteristics for low beams, and a housing (not shown) for supporting these elements, which are all common to those in the prior art.

In the present embodiment, the projection lens 3 comprises a cylindrical lens portion 31 and aspherical lens portions 32 and 33. The cylindrical lens portion 31 forms a center portion of the projection lens 3 as a semicylindrical lens whose vertical cross section has a curve constituting the lens and whose horizontal cross section has a straight line when the projector type lamp 1 is installed on a vehicle.

Therefore, the cylindrical lens portion 31 has the same vertical cross section at any position, the shape of only the cylindrical lens portion 31 is rectangular when seen from the front, and right and left end portions thereof have the same vertical cross section.

The aspherical lens portions 32 and 33 are provided at respective right and left end portions of the cylindrical lens portion 31. The aspherical lens portions 32 and 33 are halves of a projection lens which is an aspherical lens employed in the prior art and divided at a section passing through the center of the projection lens and are arranged in such a manner that their divided surfaces are in contact with the right and left end portions of the cylindrical lens portion 31.

Since it is preferred that there should be no level difference in junctions between the cylindrical lens portion 31 and the aspherical lens portions 32 and 33, an aspherical lens suitable for forming light distribution characteristics is first designed and the shape of the vertical cross section of the cylindrical lens portion 31 is determined such that the curvature of the cylindrical lens portion 31 is the same as that of the aspherical lens 32 and 33 to actually construct the projection lens. Thereby, the cylindrical lens portion 31 and the aspherical lens portions 32 and 33 have the same focusing distance.

By forming the projection lens as described above, the projection lens 3 becomes substantially oval-shaped with a length in a horizontal direction larger than a length in a vertical direction when seen from the front. According to the results of trial production and studies for carrying out the present invention by the inventors of the present invention, it has been verified that the aspect ratio of the projection lens 3 is preferably in the range of 1:1.2 to 1:5 owing to adaptability thereof to the reflector 4 which will be described hereinafter.

According to the results of the trial production and studies, it has been further verified that it is more effective to construct the reflector 4 in accordance with the above configuration of the projection lens 3. A description is subsequently given of the configuration of the reflector 4 suitable for use with the projection lens 3.

According to the present embodiment, the reflector 4 is radially divided with regard to the optical axis Z of the projector type lamp 1 into four parts; an upper reflection surface 41, a lower reflection surface 42, a right reflection surface 43 and a left reflection surface 44. This division is carried out at an angle of 10 to 45 degrees in a vertical direction from a horizontal line H passing through the optical axis Z when the projector type lamp 1 is installed on a vehicle.

The vertical cross sections of the upper reflection surface 41 and the lower reflection surface 42 are oval-shaped with a first focal point at the location of the light source 2 and a second focal point in the vicinity of the focal point of the cylindrical lens portion 31 and the horizontal cross sections thereof have a free curve with an appropriate angle within the range of the cylindrical lens portion 31.

The right reflection surface 43 is formed as an oval surface whose vertical and horizontal cross sections have a first focal point at the location of the light source 2 and a second focal point at the focal point of the aspherical lens portion 32. Likewise, the left reflection surface 44 is formed as an oval surface having a first focal point at the location of the light source 2 and a second focal point at the focal point of the aspherical lens portion 33.

As the reflector 4 is formed as described above, rays of light, from the light source 2, reflected by the upper reflection surface 41 and the lower reflection surface 42 are made incident upon the cylindrical lens portion 31 while they are converged in a vertical direction but diffused in a horizontal direction, rays of light reflected by the right reflection surface 43 are made incident upon the aspherical lens portion 32 while they are converged, and rays of light reflected by the left reflection surface 44 are made incident upon the aspherical lens portion 33 while they are converged.

When light distribution characteristics for low beams are required for the projector type lamp 1, the shade 5 for shading rays going upward after passing through the projection lens 3 out of light reflected by the reflector 4 is provided. When the projector type lamp 1 is used for a vehicle running on the left, to improve the visibility of signs on the left side of a road, a cutaway portion is generally provided in the shade 5 to project upward rays onto the left side for asymmetrical light distribution in a horizontal direction.

While there has been only one cutaway portion in the shade 5 in the prior art, there are a right cutaway portion 51 and a left cutaway portion 52 in the present embodiment. These cutaway portions 51 and 52 are formed at positions corresponding to the interface between the cylindrical lens portion 31 and the aspherical lens portion 32 of the projection lens 3 and at the interface between the cylindrical lens portion 31 and the aspherical lens portion 33, respectively.

Thereby, light fluxes projected from the aspherical lens portion 32 and the aspherical lens portion 33 have substantially the same cross section. Since the distance between the aspherical lens portion 32 and the aspherical lens portion 33 can be substantially ignored at a location 10 m ahead of the projector type lamp 1, the light fluxes from these lens potions 32 and 33 overlap with each other, thereby obtaining desired asymmetrical light distribution characteristics for a vehicle running on the left.

Figure 2:
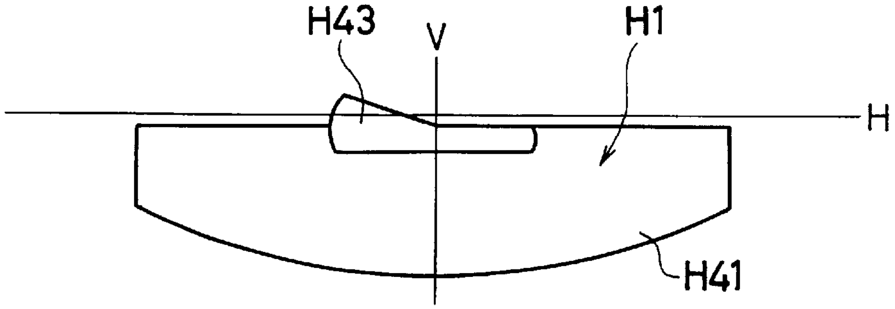
FIG. 2 is a diagram showing light distribution characteristics in accordance with the first embodiment.

FIG. 2 shows a schematic diagram of synthetic light distribution characteristics H1 of the projector type lamp 1 when the shade 5 is provided for light distribution for low beams. The synthetic light distribution characteristics H1 are the synthesis of light distribution characteristics H41 formed by light from the upper and lower reflection surfaces 41 and 42 and light distribution characteristics H43 formed by light from the right and left reflection surfaces 43 and 44.

As having been described above, rays of light reflected by the upper and lower reflection surfaces 41 and 42 are made incident upon the cylindrical lens portion 31 while they are converged in a vertical direction and have an appropriate radiant angle in a horizontal direction. Therefore, after passing through the cylindrical lens portion 31, they are converged only in a vertical direction without changing the radiant angle thereof in a horizontal direction and upward rays are shaded by the shade 5. As a result, relatively low-illuminance light distribution characteristics H41 which are wide in a horizontal direction and narrow in a vertical direction as shown in the figure and do not include upward rays are obtained.

In contrast to this, rays of light reflected by the right and left reflection surfaces 43 and 44 are converged by the aspherical lens portions 32 and 33 and projected onto a location near the center of the synthetic light distribution characteristics H1 as a spot beam having a relatively high illuminance. At this point, an asymmetrical shape is provided by the left and right cutaway portions 51 and 52 formed in the shade 5, whereby the synthetic light distribution characteristics H1 obtain an appropriate form as low beams.

In other words, according to the present embodiment, desired light distribution characteristics can be obtained even when the projection lens 4 is made substantially oval-shaped and the design form of a lamp can be altered easily by changing the length in a horizontal direction of the cylindrical lens portion 31. Since the projection lens 3 is shaped as described above, the area for letting light from the reflector 4 passing therethrough of the projection lens 3 is increased and a temperature rise thereof is reduced, thereby making it possible to form the projection lens 3 from a resin, for example.

Figure 3:
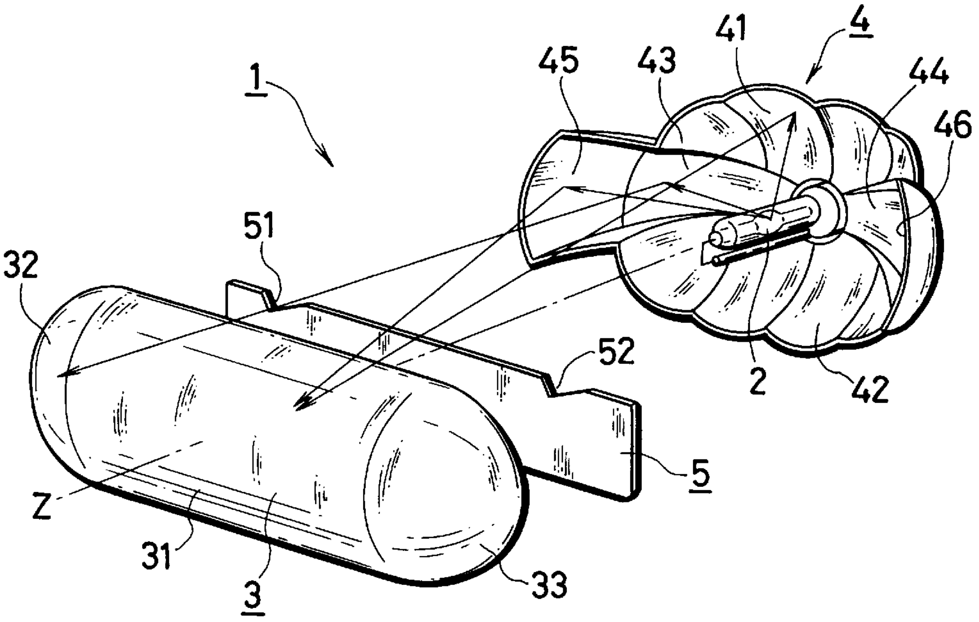
FIG. 3 is a schematic view of a projector type lamp according to a second embodiment of the present invention.

FIG. 3 shows a second embodiment of the present invention. This second embodiment comprises the projection lens 3 having the cylindrical lens portion 31 and the aspherical lens portions 32 and 33, the reflector 4 having the upper and lower reflection surfaces 41 and 42 and the right and left reflection surfaces 43 and 44, and the shade 5 which is provided as required, which are all common to those in the first embodiment.

In the second embodiment, a right auxiliary reflection surface 45 and a left auxiliary reflection surface 46 are connected to the outer ends of the right and left reflection surfaces 43 and 44, respectively. These right and left auxiliary surfaces 45 and 46 may be provided by separating parts of the right and left reflection surfaces 43 and 44 in the first embodiment.

Like the upper and lower reflection surfaces 41 and 42, the vertical cross sections of the right and left auxiliary reflection surfaces 45 and 46 are oval-shaped with a first focal point at the location of the light source 2 and a second focal point in the vicinity of the focal point of the cylindrical lens portion 31 and the horizontal cross sections thereof have a free curve with an appropriate angle within the range of the cylindrical lens portion 31 so that the reflected light is made incident upon the cylindrical lens portion 31.

Figure 4:
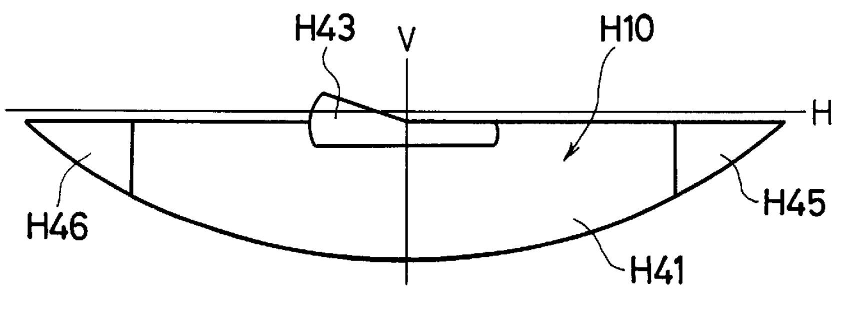
FIG. 4 is a diagram showing light distribution characteristics in accordance with the second embodiment.

FIG. 4 shows the synthetic light distribution characteristics H10 of the second embodiment configured as described above. The synthetic light distribution characteristics H10 are the synthesis of light distribution characteristics H41 obtained by the upper and lower reflection surfaces 41 and 42, light distribution characteristics H43 obtained by the right and left reflection surfaces 43 and 44 like the synthetic light distribution characteristics H of the first embodiment, and further light distribution characteristics H45 obtained by the right auxiliary reflection surface 45 and light distribution characteristics H46 obtained by the left auxiliary reflection surface 46 both of which appear at respective end portions of the light distribution characteristics H41. Thus, light distribution which is wider in a horizontal direction is obtained.

Figure 5:
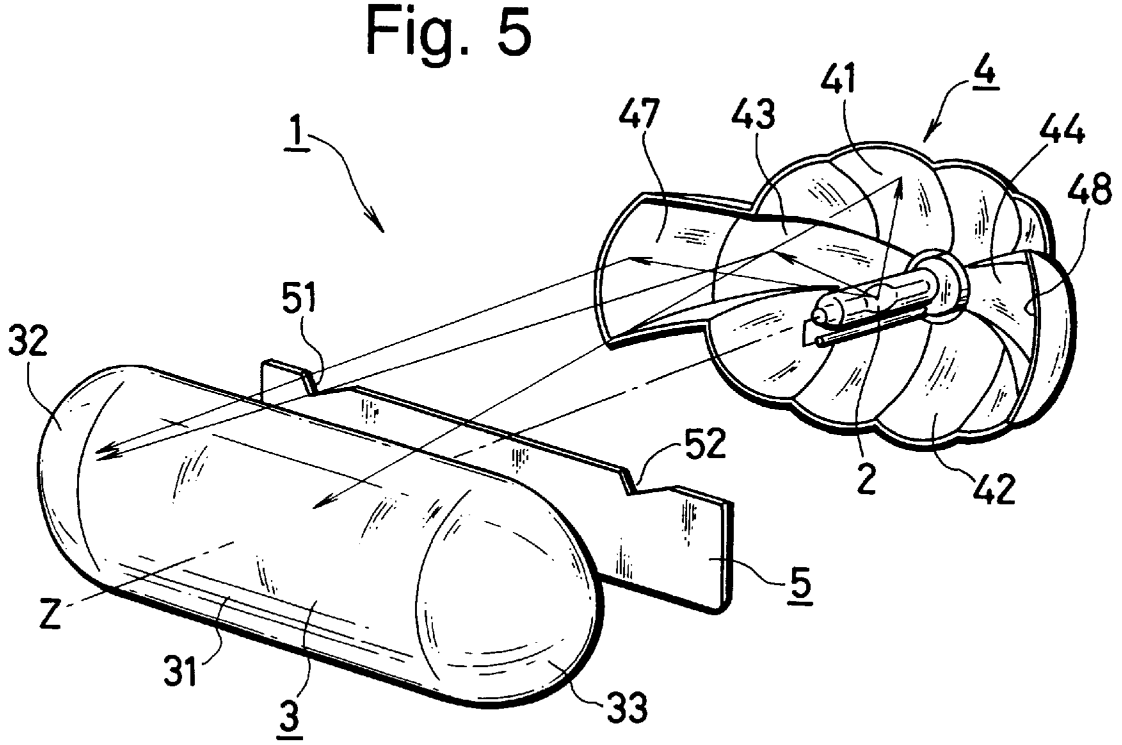
FIG. 5 is a schematic view of a projector type lamp according to a third embodiment of the present invention.

FIG. 5 shows a third embodiment of the present invention. This third embodiment comprises the projection lens 3 having the cylindrical lens portion 31 and the aspherical lens portions 32 and 33, the reflector 4 having the upper and lower reflection surfaces 41 and 42 for causing rays of light to be made incident upon the cylindrical lens portion 31, and the shade 5 which is provided as required, which are all common to those in the first embodiment.

The reflector 4 in this third embodiment also has the right and left reflection surfaces 43 and 44 in the horizontal direction, and a right auxiliary reflection surface 47 and a left auxiliary reflection surface 48 connected to the outer ends of the right and left reflection surfaces 43 and 44, respectively, which are common in shape to those in the second embodiment. In this third embodiment, the interface between the right reflection surface 43 and the right auxiliary reflection surface 47 is set at a position substantially corresponding to the interface between the cylindrical lens portion 31 and the aspherical lens portion 32 of the projection lens 3, and the interface between the left reflection surface 44 and the left auxiliary reflection surface 48 is set at a position substantially corresponding to the interface between the cylindrical lens portion 31 and the aspherical lens portion 33.

The right and left reflection surfaces 43 and 44 are formed as oval surfaces which have second focal points at the focal point of the aspherical lens portions 32 and 33, respectively, as well as the foregoing embodiments. Thus, rays of light with relatively small projecting angle are projected through the aspherical lens portions 32 and 33. However, the right and left auxiliary reflection surfaces 47 and 48 in this embodiment cause the reflected light to be made incident on the aspherical lens portions 32 and 33, respectively. This embodiment is different from the second embodiment, which causes the reflected light from the right and left auxiliary reflection surfaces 45 and 46 to be made incident on the cylindrical lens portion 31, in this point.

Therefore, the right and left auxiliary reflection surfaces 47 and 48 are formed as reflecting surfaces on the basis of oval surfaces having second focal points in the vicinity of the peaks of the aspherical lens portions 32 and 33, respectively so as to cause rays of light to be made incident on the aspherical lens portions 32 and 33. The projecting angles of rays of light projected through the aspherical lens portions 32 and 33 are arbitrarily adjustable by controlling the positions of the second focal points between the peak of the aspherical lens portions 32 and 33 and the focal points thereof.

Figure 6:
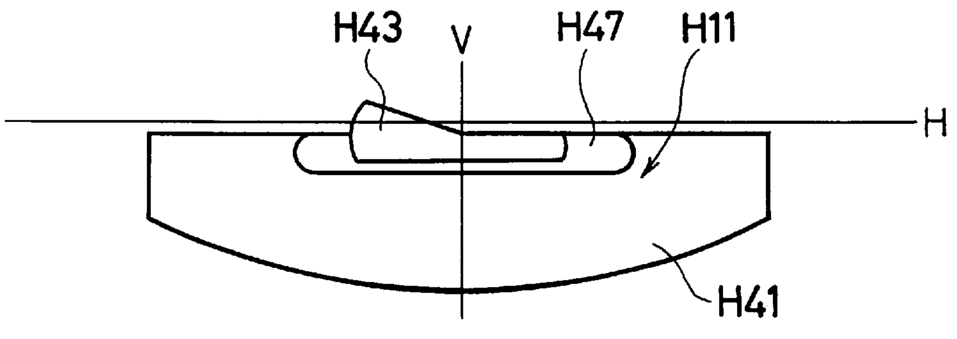
FIG. 6 is a diagram showing light distribution characteristics in accordance with the third embodiment.

FIG. 6 shows the synthetic light distribution characteristics H11 of the third embodiment configured as described above. The synthetic light distribution characteristics H11 are the synthesis of light distribution characteristics H41 obtained by the upper and lower reflection surfaces 41 and 42, light distribution characteristics H43 obtained by the right and left reflection surfaces 43 and 44 like the synthetic light distribution characteristics H1 of the first and second embodiments, and further light distribution characteristics H47 obtained by the right and left auxiliary reflection surfaces 47 and 48 which appear at the center of the light distribution characteristics H41. Thus, it is possible to improve visibility for a far distance position in the front direction of a vehicle.

Figure 7:
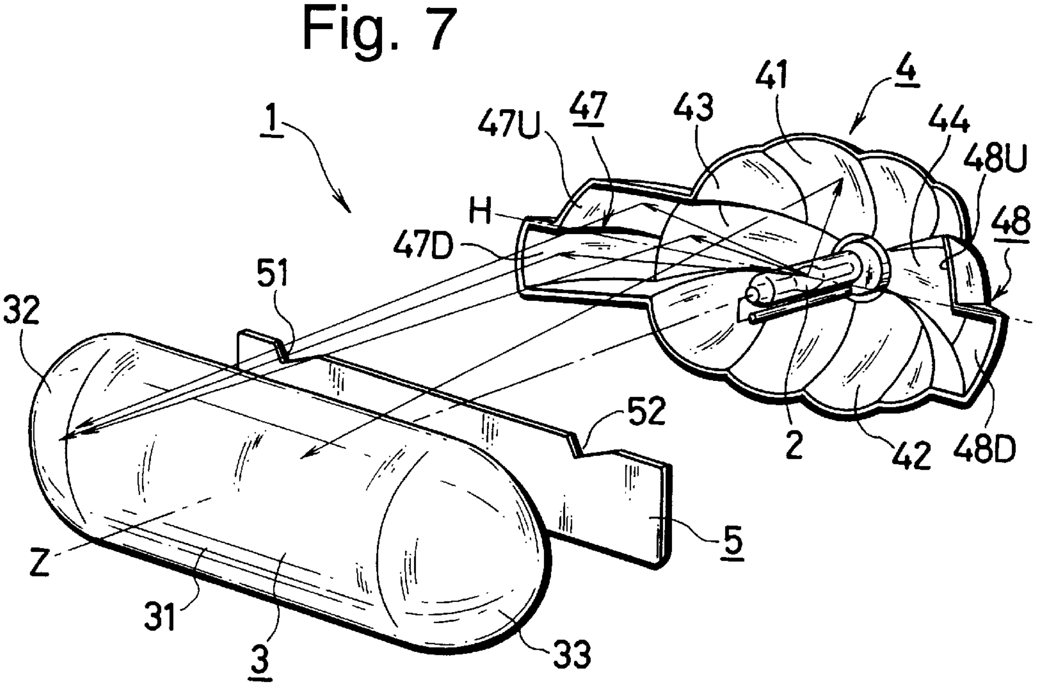
FIG. 7 is a schematic view of a projector type lamp according to a fourth embodiment of the present invention.

FIG. 7 shows a fourth embodiment of the present invention. This fourth embodiment comprises the projection lens 3 having the cylindrical lens portion 31 and the aspherical lens portions 32 and 33, the reflector 4 having the upper and lower reflection surfaces 41 and 42 for causing rays of light to be made incident upon the cylindrical lens portion 31, and the shade 5 which is provided as required, which are all common to those in the first embodiment.

The reflector 4 in this fourth embodiment also has the right and left reflection surfaces 43 and 44 in the horizontal direction, and a right auxiliary reflection surface 47 and a left auxiliary reflection surface 48 connected to the outer ends of the right and left reflection surfaces 43 and 44, respectively, which are common in shape to those in the second embodiment. Rays of light from the right and left auxiliary reflection surfaces 47 and 48 are caused to be made incident upon the aspherical lens portions 32 and 33, which are common to those in the third embodiment.

Now, functions of the right and left auxiliary reflection surfaces 47 and 48 in the third embodiment are considered in the following description. The second focal points of the right and left auxiliary reflection surfaces 47 and 48 are set at the focal points of the aspherical lens portions 32 and 33, in other words they are set at positions in the forward side of the projection with regard to the shade 5. Accordingly, a light flux is not yet made to sufficiently converge when it passes through a position of the shade 5, thereby the light flux is at a state having a relatively large area.

Thus, in the third embodiment, rays of light reflected by lower halves of the right and left auxiliary reflection surfaces 47 and 48 are almost shaded by the shade to invalidate the reflected light.

This fourth embodiment is made by taking this fact into consideration, where the right auxiliary reflection surface 47 are divided at a horizontal line H passing through the optical axis Z into a right upper auxiliary reflection surface 47U and a right lower auxiliary reflection surface 47D, and the left auxiliary reflection surface 48 are also divided into a left upper auxiliary reflection surface 48U and a left lower auxiliary reflection surface 48D.

In this embodiment, the right and left upper auxiliary reflection surfaces 47U and 48U are formed as oval surfaces having second focal points in the vicinity of the peaks of the aspherical lens portions 32 and 33, respectively, as well as the third embodiment. On the other hand, the right and left lower auxiliary reflection surfaces 47D and 48D are formed such that they have the horizontal cross sections formed on the basis of a paraboloid having a focal point at the light source, which causes light to be reflected in a direction parallel to the optical axis Z, and they also have the vertical cross sections formed on the basis of an oval surface having a second focal point on the extended line which is formed by outwardly extending from the focal point of the projection lens 3.

As the projector type lamp 1 of the present embodiment is constructed as described above, reflected rays of light from the right and left lower auxiliary reflection surfaces 47D and 48D are made to sufficiently converge as a line when they pass through positions of the shade 5. Thus, all reflected rays is made incident upon the aspherical lens portions 32 and 33 of the projection lens 3 without being shaded by the shade 5, thereby allowing the reflected rays to be utilized as projecting rays.

Figure 8:
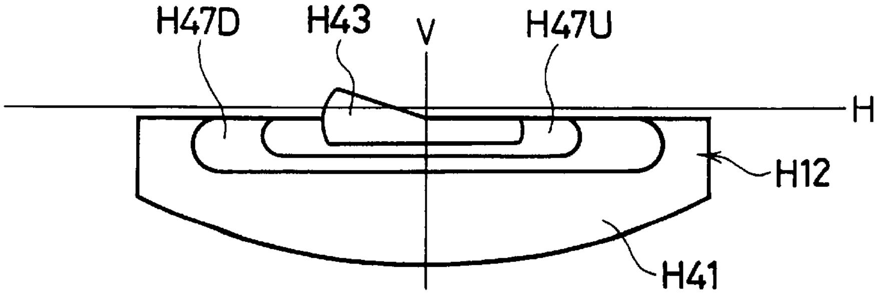
FIG. 8 is a diagram showing light distribution characteristics in accordance with the fourth embodiment.

FIG. 8 shows the synthetic light distribution characteristics H12 of the fourth embodiment configured as described above. The synthetic light distribution characteristics H12 are the synthesis of light distribution characteristics H41 obtained by the upper and lower reflection surfaces 41 and 42, light distribution characteristics H43 obtained by the right and left reflection surfaces 43 and 44 like the synthetic light distribution characteristics H1 of the first, second and third embodiments, and further light distribution characteristics H47U obtained by the right and left upper auxiliary reflection surfaces 47U and 48U which appear at the center of the light distribution characteristics H41. The brightness of the synthetic light distribution characteristics H12 at this stage, or the brightness of H41+H43+H47U, is substantially equals to that of the synthetic light distribution characteristics H11 of the third embodiment wherein reflected light from the lower halves of the right and left auxiliary reflection surfaces 47 and 48 is shaded by the shade 5.

In addition, the synthetic light distribution characteristics H12 of the fourth embodiment comprises light distribution characteristics H47D obtained by the right and left lower auxiliary reflection surfaces 47D and 48D, which is superposed at the center of the light distribution characteristics H41. Thus, it is possible to make a far distance position in the front direction of a vehicle well-lighted by the synthetic light distribution characteristics H12 and therefore to further improve visibility for a far distance position in the front direction of a vehicle.

Figure 9:
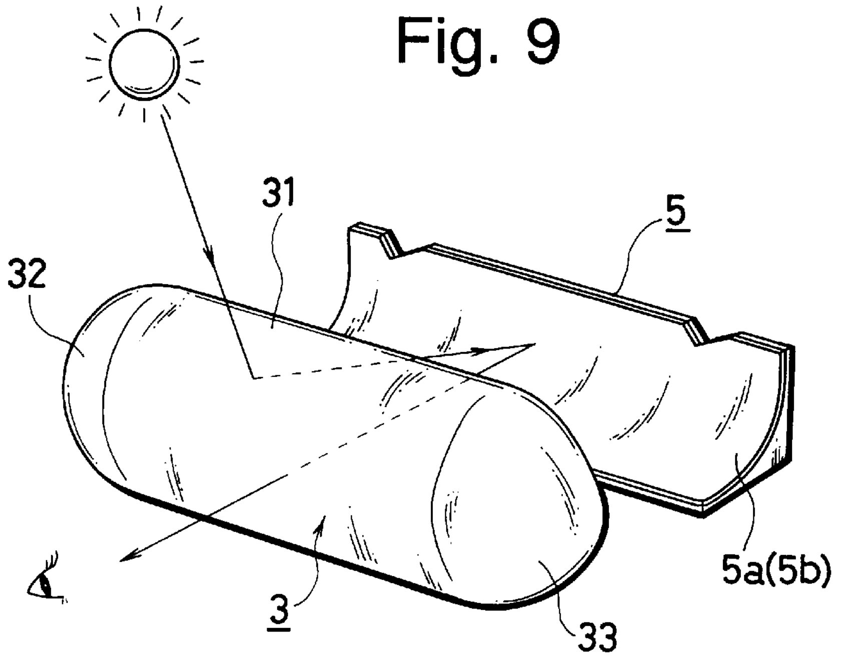
FIG. 9 is a schematic view of the essential part of a projector type lamp according to a fifth embodiment of the present invention.

FIG. 9 shows the essential part of a fifth embodiment of the present invention. Since a cylindrical lens portion 31 having no curvature in one direction is provided in the projection lens 3, the internal structure of the projector type lamp 1 of the present embodiment, such as the reflector 4 and the shade 5, can be seen from outside by external light when the lamp 1 is off in the daytime. Especially, the shade 5 in the vicinity of the focal point of the projection lens 3 can be seen enlarged.

In this fifth embodiment, the surface on the projection lens 3 side of the shade 5 is subjected to a reflection treatment 5*a* by the vacuum vapor deposition of aluminum or a coloring treatment 5*b* by the application of the same color coating as that of a car body. Thereby, the reflection treatment 5*a* (or coloring treatment 5*b*) can be seen from a viewer by external light when the projector type lamp 1 is off.

In the case of the reflection treatment 5*a*, almost the entire surface of the projection lens 3 is shining with metallic luster, thereby appealing the presence of the projector type lamp 1. In the case of the coloring treatment 5*b*, almost the entire surface of the projection lens 3 becomes the same color as that of a car body, thereby concealing the presence of the projector type lamp 1. Thus, design freedom is improved by selecting the treatment.

Figure 10:
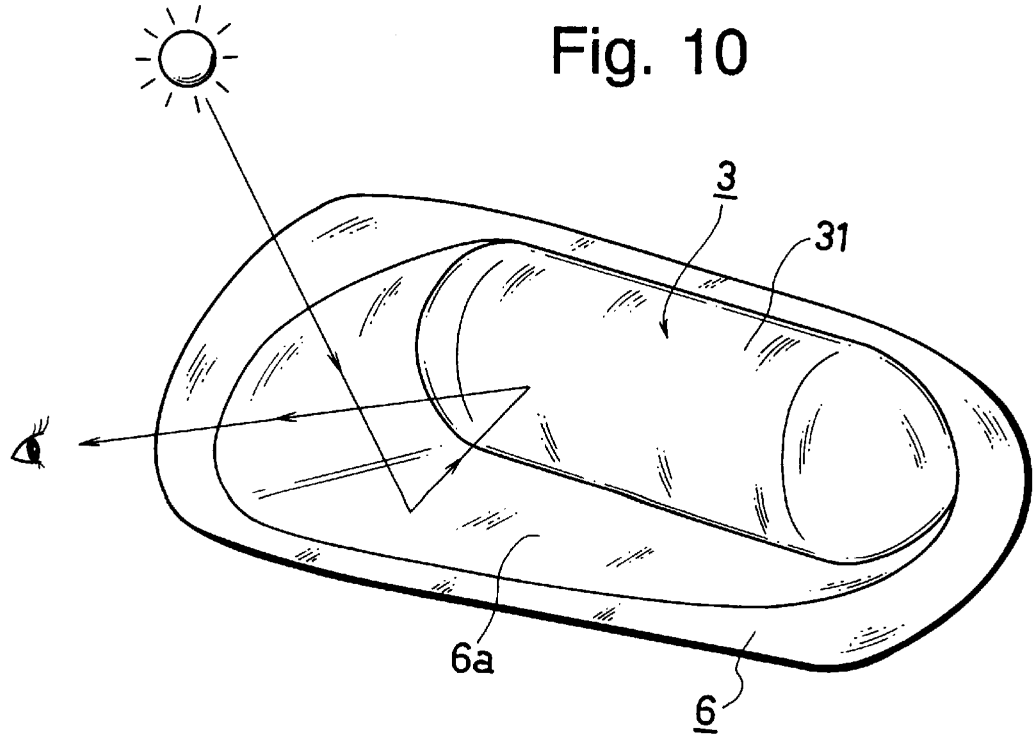
FIG. 10 is a schematic view of the essential part of a projector type lamp according to a sixth embodiment of the present invention.
Figure 11:
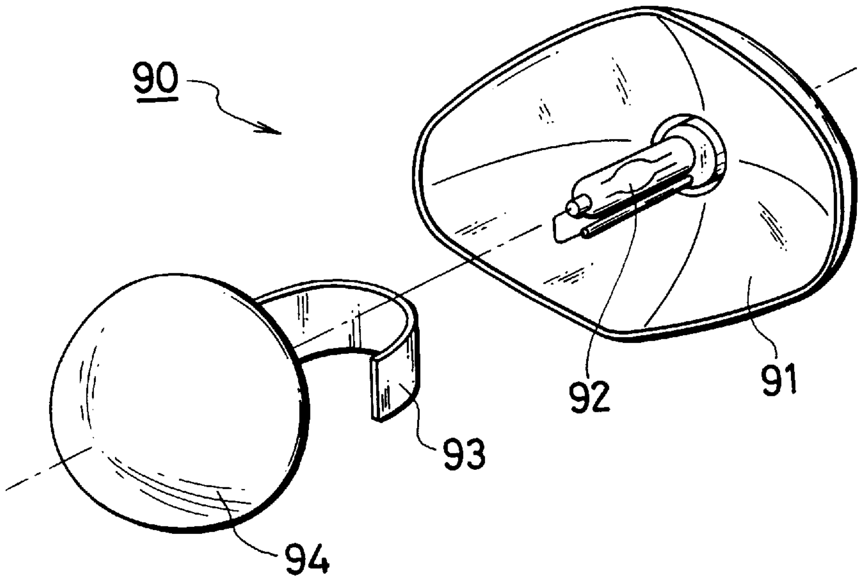
Fig. 11 Prior Art
FIG. 11 is a diagram of the prior art.
Figure 12:
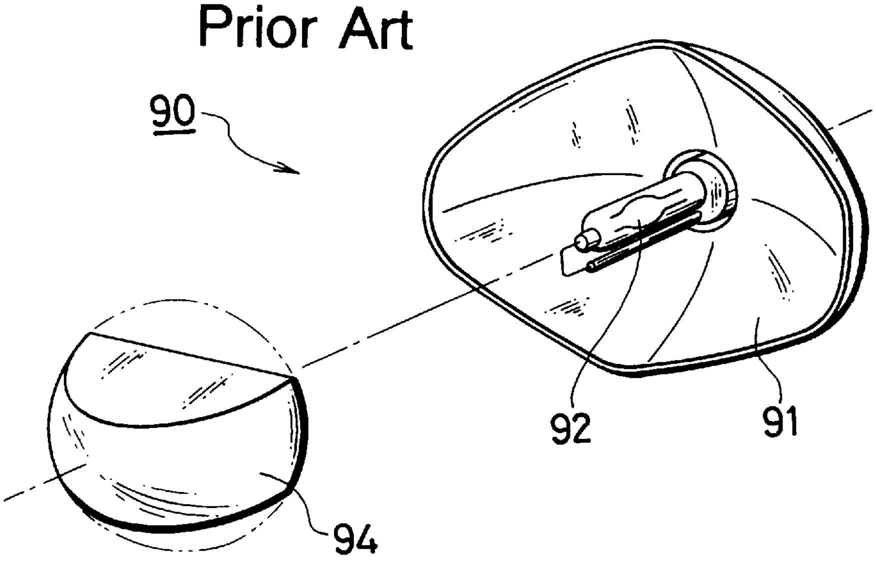
Fig. 12 Prior Art
FIG. 12 is a diagram of another prior art.

FIG. 10 shows the essential part of a sixth embodiment of the present invention. Since a cylindrical lens portion 31 having no curvature in one direction is provided in the projection lens 3, the function of projecting an exterior on the surface of this projection lens 3 can be expected when the projector type lamp 1 of the present invention is off in the daytime.

As shown in the figure, when a hood 6 is provided at a position where projected light in front of the projection lens 3 is not shaded and the interior surface of the hood 6 is subjected to a reflection treatment 6*a* by the vacuum vapor deposition of aluminum, it is possible to make the surface of the projection lens 3 appear shining with metallic luster like the reflection treatment 5*a* of the fifth embodiment.

As described above, according to the projector type lamp of the present invention, the shape and area of the projection lens can be changed without losing characteristics such as the form of the light distribution characteristics of the projector type lamp. Thereby, the present invention provides an extremely excellent effect that design freedom can be provided to a projector type lamp whose design has been difficult to be changed.

Furthermore, since the area of the projection lens can be increased, the light emission area at the time of lighting sharply increases, thereby improving the visibility of the projector type lamp from a vehicle running in an opposite direction and a passenger. Therefore, the present invention also provides an excellent effect that performance such as safety is improved. Further, the temperature of the projection lens is lowered by increasing the light emission area, thereby making it possible to form the projection lens from a resin. Thus, the present invention provides an excellent effect that costs can be reduced.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A projector type lamp comprising a light source, a projection lens, a reflector, and a housing for supporting these elements, wherein the projection lens comprises a cylindrical lens portion which forms a center portion of the projection lens and whose vertical cross section has a curve when the projector type lamp is installed and aspherical lens portions which are halves of an aspherical lens and formed continuous to the respective right and left end portions of the cylindrical lens portion, and the reflector is divided into four parts located in upper and lower sides and right and left sides thereof when the projector type lamp is installed; an upper reflection surface, a lower reflection surface, a right reflection surface, and a left reflection surface, the four reflection surfaces being formed as curved surfaces on the basis of oval surfaces and combined together.

2. The projector type lamp of claim 1, wherein the division of the reflector is carried out along radially extending lines passing through the center of the reflector and in an angular range of 10 to 45 degrees in upper and lower directions from a horizontal line when the projector type lamp is installed.

3. The projector type lamp of claim 1, wherein the projector type lamp is constructed such that the upper and lower reflection surfaces of the reflector generate rays of light which are made incident upon the cylindrical lens portion of the projection lens and the right and left reflection surfaces generate rays of light which are made incident upon the aspherical lens portions.

4. The projector type lamp of claim 1, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces, the right and left reflection surfaces generate rays of light which are made incident upon the aspherical lens portions, and the auxiliary reflection surfaces generate rays of light which are made incident upon the cylindrical lens portion.

5. The projector type lamp of claim 1, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces with interfaces at positions substantially corresponding to interfaces between the cylindrical lens portion and the aspherical lens portions, each of the right and left reflection surfaces has a second focal point in the vicinity of the focal point of the aspherical lens portion, and each of the auxiliary reflection surfaces has a second focal point in the vicinity of the peak of the aspherical lens portion.

6. The projector type lamp of claim 1, wherein the projector type lamp is constructed such that the upper and lower reflection surfaces of the reflector generate rays of light which are made incident upon the cylindrical lens portion of the projection lens, auxiliary reflection surfaces being connected to the outer ends of the right and left reflection surfaces with interfaces at positions substantially corresponding to interfaces between the cylindrical lens portion and the aspherical lens portions, each of the auxiliary reflection surfaces being divided at a horizontal line passing through the center of the reflector when the projector type lamp is installed into a upper auxiliary reflection surface and a lower auxiliary reflection surface, each of the right and left reflection surfaces has a second focal point in the vicinity of the focal point of the aspherical lens portion, each of the upper auxiliary reflection surfaces has a second focal point in the vicinity of the peak of the aspherical lens portion, and each of the lower auxiliary reflection surfaces has a second focal point on the extended line which is formed by outwardly extending the focal point of the projection lens so as to obtain reflected light caused to converge in the vertical direction and caused to be parallel to the optical axis in the horizontal direction.

7. The projector type lamp of claim 1, wherein the projector type lamp further comprises a shade.

8. The projector type lamp of claim 3, wherein the projector type lamp further comprises a shade.

9. The projector type lamp of claim 4, wherein the projector type lamp further comprises a shade.

10. The projector type lamp of claim 7, wherein a cutaway portion in the shade for forming an asymmetrical pattern in light distribution characteristics is provided at two positions substantially corresponding to the interfaces between the cylindrical lens portion and the aspherical lens portions of the projection lens.

11. The projector type lamp of claim 8, wherein a cutaway portion in the shade for forming an asymmetrical pattern in light distribution characteristics is provided at two positions substantially corresponding to the interfaces between the cylindrical lens portion and the aspherical lens portions of the projection lens.

12. The projector type lamp of claim 9, wherein a cutaway portion in the shade for forming an asymmetrical pattern in light distribution characteristics is provided at two positions substantially corresponding to the interfaces between the cylindrical lens portion and the aspherical lens portions of the projection lens.

13. A projector type lamp comprising a light source, a projection lens, a reflector, a shade which is provided as required, and a housing for supporting these elements, wherein the projection lens comprises a cylindrical lens portion which forms a center portion of the projection lens and whose vertical cross section has a curve when the projector type lamp is installed and aspherical lens portions which are halves of an aspherical lens and formed continuous to the respective right and left end portions of the cylindrical lens portion.

14. The projector type lamp of claim 13, wherein the projection lens has an aspect ratio of 1:1.2 to 1:5.

15. The projector type lamp of claim 13, wherein at least the interior surface on the projection lens side of the shade of the projector type lamp is subjected to a reflection treatment or a coloring treatment.

16. The projector type lamp of claim 13, wherein a hood whose interior surface is subjected to a reflection treatment is provided in front of the projection lens in an illumination direction in such a manner that it surrounds the projection lens.

17. The projector type lamp of claim 15, wherein a hood whose interior surface is subjected to a reflection treatment is provided in front of the projection lens in an illumination direction in such a manner that it surrounds the projection lens.

* * * * *